Sept. 10, 1935.  J. S. BRADY ET AL  2,014,063

SELF CLEANING FAUCET FILTER

Filed June 6, 1934

Inventors
JOHN S. BRADY
and DENNIS A. McCARTHY
By Mason Fenwick & Lawrence
Attorneys Patented Sept. 10, 1935

2,014,063

UNITED STATES PATENT OFFICE 2,014,063

SELF-CLEANING FAUCET FILTER

John S. Brady and Dennis A. McCarthy, Wilkes-Barre, Pa.

Application June 6, 1934, Serial No. 729,336

1 Claim. (Cl. 210—82)

The invention forming the subject matter of this application relates to improvements in filters adapted to be detachably connected to faucets supplying drinking water from city mains or other sources of water supply.

The main object of the invention is to provide a detachable filter, of the character referred to, which will operate to supply clean filtered water through a suitable screen in such manner as to avoid filtering through filter screens upon which sediment and other objectionable matter has been allowed to accumulate.

In the patent to Brady, No. 1,713,370, May 14, 1923, there is shown a detachable filter which performs some of the functions of the present device. However, in the operation of the patented device it is necessary for an operator to distort the filter screen to obtain a supply of filtered water. This mode of operation of the said patented device imposes an undue amount of wear on the filter screen and necessitates frequent replacement of the screen. It is therefore a further object of the present invention to provide a filter structure in which the screen is automatically cleaned after each operation of the device, and in which the screen is subjected only to such wear as may be imposed by the flow of water therethrough.

Other objects of the invention will appear as the following description of a preferred and practical embodiment thereof proceeds.

Figure 1:
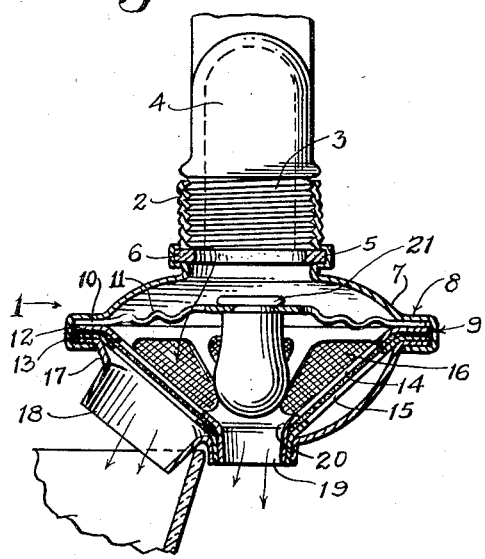
Figure 1 is a central vertical section through one form of a filter constructed in accordance with the present invention.

As shown in Figures 1 to 4, inclusive, of the drawing, the invention comprises a casing 1, preferably stamped from sheet metal and provided with a screw threaded tubular portion 2 adapted to be connected to the externally screw threaded end 3 of a faucet 4 which may be connected to any suitable source of water supply. The casing 1 is shaped so as to provide a recess 5 adapted to receive a rubber washer or gasket 6 for the purpose of forming a water-tight connection between the lower end of the faucet 4 and the casing 1.

Below the recess 5, the casing 1 is flared outwardly to form a dome 7 terminating in an outwardly directed annular flange 8 which is pressed downwardly and inwardly to form an annular recess 9. The outer ends of the arms 10 of a plunger supporting spider 11 are clamped in the recess 9 against the cooperating flanges 12 and 13 of inner and outer frusto-conical frames 14 and 15 having secured between them a correspondingly shaped filter screen 16. In the same recess 9 there is also clamped an outer casing 17 having a discharge outlet 18 formed at one side thereof to conduct filtered water therethrough. The lower ends of the frames 14 and 15 are constructed to form a raw water outlet 19, the upper end of which is shaped to form a valve seat 20 for a plunger valve 21 suitably secured to the center of the spider 11.

Figure 2:
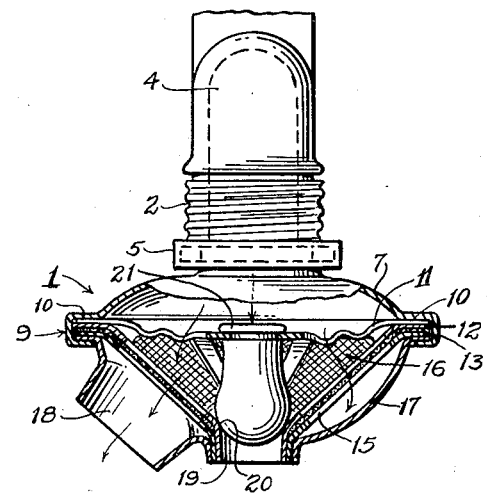
Figure 2 is a sectional elevation illustrating the device shown in Figure 1 with its parts in different positions.
Figure 3:
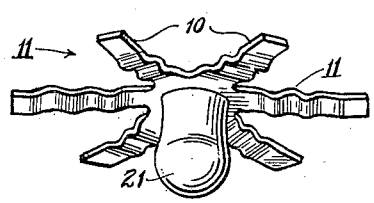
Figure 3 is a perspective view of a resilient spider used to support a plunger valve forming an essential element of this invention.
Figure 4:
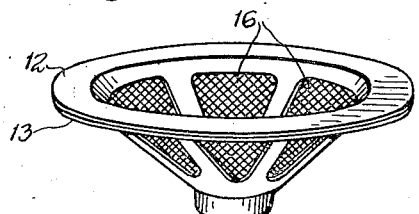
Figure 4 is a perspective view of one form of filter screen adapted for use in the construction shown in Figures 1 and 2.

As will be apparent from Figures 1 and 2 of the drawing, the spider 11 is shaped so as normally to hold the plunger valve 21 out of contact with its valve seat 20. When water is caused to flow through the faucet 4, the initial low pressure is not sufficient to force the plunger valve to its seat; therefore the raw water flows around the plunger valve and against the filter screen 16 to remove sediment therefrom and cause it to pass out through the raw water outlet 19. As the pressure increases by further opening of the faucet 4, the plunger 21 becomes depressed until it closes the valve seat 20. In this closing position of the plunger all the water must of necessity pass through the filter screen 16 and out through the filtered water outlet 18.

When the faucet is closed the reduction in pressure permits the plunger valve to rise from its seat 20, and the flow of water during the opening movement of this valve washes all sediment which may have been deposited on the filter screen during the previous filter operation. It will be evident that in the operation of this device the filter screen is not depressed or distorted in any way by the application of pressure thereto for the purpose of closing the raw water outlet. Therefore, the undue wear on the filter screens caused by distortion thereof, as in the patent above referred to, is completely eliminated. At the same time, all the self-cleaning advantages of the prior filter device is retained.

Figure 5:
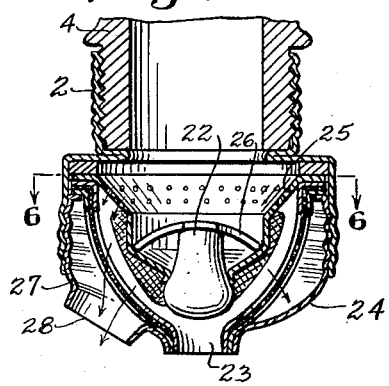
Figure 5 is a central vertical section through a modification of the device.
Figure 6:
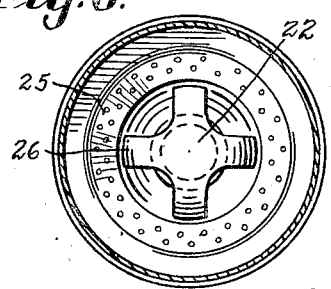
Figure 6 is a horizontal section taken on the line 6—6 of Figure 5.

In the form of the invention shown in Figures 5 and 6, a plunger 22, corresponding in function and anode of operation with the plunger 21, is used to control a raw water outlet 23 formed at the lower end of an inverted dome-shaped filter screen structure 24. Inwardly directed arms 25, suitably secured to the structure 24, support a resilient spider 26 preferably formed integral with plunger 22. It is intended that this plunger 22 and spider 26 be made of resilient material, such as rubber, and that the spider arm be shaped so as normally to hold the plunger 22 in open position. A casing 27 provided with a filtered water outlet 28 encloses the filter screen and plunger mechanism and performs the same function as the casing 17 in the previously described form of this invention.

Figure 7:
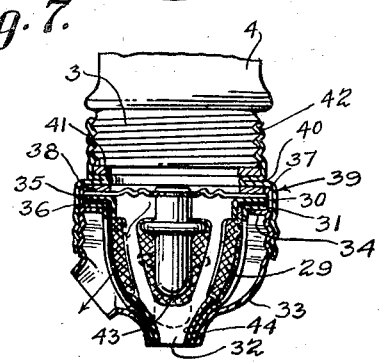
Figure 7 is a central vertical section through another modification of the invention.

In the form of the invention shown in Figure 7, the filter screen 29 is clamped between two frame members 30 and 31 which terminate in a downwardly directed raw water outlet 32. An outer casing 33 surrounds the filter screen 29 and its frame members 30 and 31; and, at its upper end is provided with an inwardly directed flange 34 which serves as a clamping member for clamping the outwardly directed flanges 35 and 36 on the upper ends of the frame members 30 and 31 against the arms of the spider 37 and a resilient washer 38. To secure this clamping effect the upper end of the casing 33 is screw threaded to mesh with corresponding threads on a casing 39 which is stamped out to form an inwardly directed annular flange 40 adapted to be pressed against a gasket or washer 41 when the upper screw threaded tubular end 42 of the casing 39 is threaded onto the screw threaded part 3 of the faucet 4. A valve plunger 43 is normally supported by the spider 37 out of closing contact with the valve seat 44 formed at the lower end of the frame members 30 and 31. The operation of this form of the invention is substantially the same as in the previously described form and will be apparent without further description to those skilled in the art.

The invention must not be considered as limited to any particular means for attaching the filter to a faucet. The screw threaded connection is illustrated here merely to show one convenient means for securing the device to a particular type of faucet. Where the outlet end of the faucet is smooth, any suitable form of clamping mechanism may be used to secure the device thereto.

What we claim is:

A filter for liquids comprising a casing adapted to be connected to a faucet and having two outlets, a frusto-conical filter screen covering one of said outlets, a plunger valve, means for yieldingly supporting said valve within said casing and normally out of closing contact with the other outlet and operable automatically by liquid flowing through said faucet to move the valve into closing position, said screen being spaced apart symmetrically from and around said plunger valve within said casing, whereby the flow of liquid from the faucet to the said other outlet is applied with equal force to all parts of the screen.

JOHN S. BRADY.
DENNIS A. McCARTHY.